Sept. 19, 1961    R. A. KOOLHOF    3,001,085
STATIC MAGNETIC TRIGGERS WITH CONSTANT OUTPUT
Filed July 23, 1957

INVENTOR
REGNERUS AGINUS KOOLHOF
BY
AGENT

3,001,085
STATIC MAGNETIC TRIGGERS WITH CONSTANT OUTPUT

Regnerus Aginus Koolhof, Hilversum, Netherlands, assignor to North American Philips Company, Inc., New York, N.Y., a corporation of Delaware
Filed July 23, 1957, Ser. No. 673,643
Claims priority, application Netherlands Sept. 4, 1956
7 Claims. (Cl. 307—88)

This invention relates to circuits for powering one or more static magnetic triggers with electric current.

As is well-known, static magnetic triggers comprise a core of ferromagnetic material showing a substantially rectangular magnetisation curve, with the core being coupled with one or more input and output windings. They are used inter alia for recording coded information, the information being determined by the condition of remanence of the ferromagnetic material. A determined condition of remanence corresponding to "0" or "1" of the coded information may be adjusted by current pulses led through at least one input winding coupled to the ferromagnetic core. An "0" is characterized, for example, by a positive remanence and a "1" by a negative remanence. The condition of remanence may be determined, or in other words the information recorded in the core may be read out, by measuring the voltage set up across an output winding coupled to the core under the action of a further current pulse through the input winding.

As is well-known, in many cases the information is recorded and read out by supplying current pulses to two input windings, which together are capable of bringing the core from one condition of remanence into the other, but which each individually cannot bring about this change-over.

It has been found that the variation of the magnetisation curve of such cores is usually dependent upon the ambient temperature. This results in a variation with temperature of both the voltage set up across the output winding by the action of the reading pulses and the time required for changing-over the core from one condition of remanence into the other (which time is a measure of the maximum permissible recurrence frequency of the pulses to be supplied to the input windings). It will be evident that this variation is not particularly desirable.

An object of the invention is to provide a circuit which has an output voltage and a change-over time which are substantially constant with varying ambient temperature.

For this purpose, the circuit according to the invention is characterized in that the value of the current supplied decreases with increasing temperature.

In order that the invention may be readily carried into effect, it will now be described more fully, by way of example, with reference to the accompanying drawing, in which.

Figure 1:
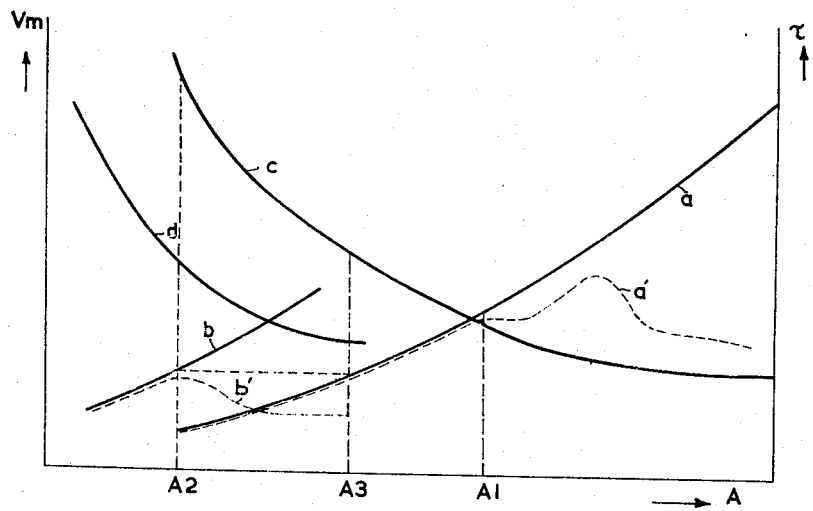
FIG. 1 shows a set of curves for better understanding of the invention.

In FIG. 1, $a$ and $b$ indicate curves showing the relationship between the voltage $V_m$ set up across the output winding of a static magnetic trigger under the action of current pulses supplied to an input winding, the amplitude of the current pulses having a value such that the core of the trigger is changed-over from one condition of remanence to the other, and said amplitude A, and this for the case that only alternately positive and negative current pulses of so large amplitudes are supplied to the input winding. Curve $a$ applies to a temperature $T_1$ and curve $b$ to a temperature $T_2$, the temperature $T_1$ being lower than $T_2$.

The curves $a'$ and $b'$ shown in dashed lines represent the same relationship if between each positive and negative current pulse a series of negative current pulses is supplied to the input winding, the amplitude of which is about half the amplitude of the current pulse changing-over the core. The variation of the curves $a'$ and $b'$ shows that above a given value for the amplitude A ($A_1$ for $T_1$ and $A_2$ for $T_2$, respectively) there is a decrease in the output voltage of the core set up by the action of a current pulse bringing about a change-over if, beforehand, a series of pulses having said half amplitude is supplied to the input winding of the core. Furthermore, the last-mentioned pulses then also supply a considerable output voltage and this, as will be evident, is highly undesirable for satisfactory operation of the trigger.

The curves $c$ and $d$ show the relationship between the amplitude A and the associated change-over time, viz. $c$ for the case that the ambient temperature is $T_1$ and $d$ for the case that the ambient temperature is $T_2$.

In view of the divergence between the curve $b$ and $b'$, it has been found (assuming that the ambient temperature does not exceed the value $T_2$) that the maximum permissible amplitude of the current pulses bringing about a change-over must not exceed the value $A_2$ at the temperature $T_2$. However, from the figure it also appears that the change-over time with these amplitudes for the temperature $T_1$ is in practice twice that for the temperature $T_2$ and that the output voltage at the temperaure $T_1$ is about half that at the temperature $T_2$.

According to the invention, by providing that at a lower temperature the current pulses bringing about a change-over have a larger amplitude A, that is to say such that at the temperature $T_1$ this amplitude has a value $A_3$, it is achieved that in the whole temperature range both the output voltage of the trigger and the time required for changing-over the core from one condition of remanence to the other are substantially constant.

Figure 2:
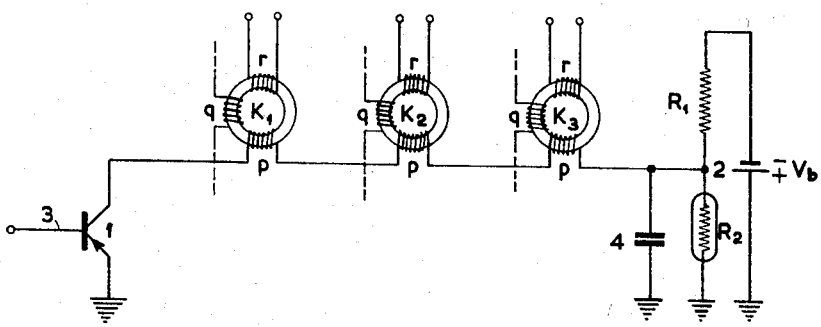
FIG. 2 shows a circuit according to the invention.

FIG. 2 shows a circuit according to the invention. $K_1$, $K_2$ and $K_3$ indicate cores of ferromagnetic material having substantially rectangular magnetisation curves, which cores each comprise two input windings $p$ and $q$ and an output winding $r$. The windings $p$ and $q$ must each have supplied to them a current pulse having an amplitude equal to half the amplitude which is required to bring about a change-over. In the figure, the windings $p$ of the various cores are connected in series and are powered from a common voltage source $V_b$. In the embodiment shown, a transistor 1 fulfills the function of a switch, which is controlled by negative current pulses supplied to the base 3 of this transistor.

In a similar manner, the windings $q$, connected in series with windings of further cores not shown in the figure, may be powered from a common voltage source.

The amplitude of the current pulses flowing through the windings $p$ is now determined by the internal resistance of transistor 1 and the voltage across point 2. The point 2 constitutes the tapping on a potentiometer circuit comprising resistors $R_1$ and $R_2$, resistor $R_2$ being a temperature-dependent resistor of negative temperature coefficient. It is thus achieved that the voltage at point 2 decreases upon increasing temperature, so that the current pulses flowing through the windings $p$ decrease in amplitude. In the figure, resistor $R_2$ is shunted by a capacitor 4 for the purpose of decoupling the voltage source for the pulse frequencies.

While the invention has been described in connection with a specific embodiment, other modifications thereof will be readily apparent to those skilled in the art without departing from the spirit and scope of the invention as defined in the appended claims.

What is claimed is:

1. A static magnetic trigger comprising a core of ferromagnetic material having a substantially rectangular hysteresis loop, at least one input winding coupled to said core, a supply circuit for supplying current pulses to said input winding, said core and said supply circuit both being exposed to the ambient temperature, said supply circuit comprising means operative to decrease the amplitude of said input winding current pulses upon an increase in the ambient temperature, an output winding coupled to said core, and means for deriving an output voltage from said output winding, said output voltage remaining substantially constant with varying ambient temperatures.

2. A circuit as claimed in claim 1, wherein said means operative to decrease the amplitude of the current pulses comprises a temperature dependent resistor with a negative temperature coefficient, the supply circuit including a voltage source shunted by the series combination of said temperature dependent resistor and a second resistor, the current pulses supplied to the input winding being derived from the junction of the two resistors.

3. A static magnetic trigger comprising a core of ferromagnetic material having a substantially rectangular hysteresis loop, a pair of input windings coupled to said core, a supply circuit for supplying current pulses to each of said input windings, said core and said supply circuit both being exposed to the ambient temperature, said current pulses having an amplitude less than that necessary to change over said core from one remanence state to another, said supply circuit comprising means operative to decrease the amplitude of said input winding current pulses upon an increase in the ambient temperature, an output winding coupled to said core, and means for deriving an output voltage from said output winding, said output voltage remaining substantially constant with varying ambient temperatures.

4. A static magnetic memory circuit comprising a plurality of cores composed of ferromagnetic material having a substantially rectangular hysteresis loop, at least one input winding coupled to each of said cores, said input windings being connected in series, a supply circuit for supplying current pulses to said input winding, said cores and said supply circuit being exposed to the ambient temperature, said supply circuit comprising means operative to decrease the amplitude of said input winding current pulses upon an increase in the ambient temperature, an output winding coupled to each core, and means for deriving an output voltage from each of said output windings, said output voltage remaining substantially constant with varying ambient temperatures.

5. A circuit as claimed in claim 4, wherein said means operative to decrease the amplitude of the current pulses comprises a temperature dependent resistor with a negative temperature coefficient, the supply circuit including a voltage source shunted by the series combination of said temperature dependent resistor and a second resistor, the current pulses supplied to the input windings being derived from the junction of the two resistors.

6. A static magnetic memory circuit comprising a plurality of cores composed of ferromagnetic material having a substantially rectangular hysteresis loop, a pair of input windings coupled to each of said cores, one winding on each core being connected in series with a winding on each of the other cores, a supply circuit for supplying current pulses to said windings, said cores and said supply circuit being exposed to the ambient temperature, said current pulses having an amplitude less than that necessary to change over a core from one remanence state to another, said supply circuit comprising means operative to decrease the amplitude of said input winding current pulses upon an increase in the ambient temperature, an output winding coupled to each core, and means for deriving an output voltage from each of said output windings, said output winding remaining substantially constant with varying ambient temperatures.

7. A circuit as claimed in claim 6, wherein said means operative to decrease the amplitude of the current pulses comprises a temperature dependent resistor with a negative temperature coefficient, the supply circuit including a voltage source shunted by the series combination of said temperature dependent resistor and a second resistor, the current pulses supplied to the input windings being derived from the junction of the resistors.

References Cited in the file of this patent

UNITED STATES PATENTS

| | | |
|---|---|---|
| 2,725,519 | Malick et al. | Nov. 29, 1955 |
| 2,734,187 | Rajchman | Feb. 7, 1956 |
| 2,798,169 | Eckert | July 2, 1957 |